(12) United States Patent
Lumry et al.

(10) Patent No.: US 8,622,744 B2
(45) Date of Patent: Jan. 7, 2014

(54) MOBILE TRAINING TRAILER FOR ELECTRIC TRANSMISSION LINES

(75) Inventors: Mark Whitman Lumry, Grants Pass, OR (US); Gordon Brent Winfree, Fort Myers, FL (US)

(73) Assignee: Quanta Associates, L.P., Houston, TX (US)

( * ) Notice: Subject to any disclaimer, the term of this patent is extended or adjusted under 35 U.S.C. 154(b) by 331 days.

(21) Appl. No.: 13/034,848

(22) Filed: Feb. 25, 2011

(65) Prior Publication Data

US 2011/0207097 A1    Aug. 25, 2011

Related U.S. Application Data

(60) Provisional application No. 61/308,200, filed on Feb. 25, 2010.

(51) Int. Cl.
G09B 19/00    (2006.01)
(52) U.S. Cl.
USPC .......................................................... 434/226
(58) Field of Classification Search
USPC .............. 434/72, 74, 79, 219, 226; 52/64, 66
See application file for complete search history.

(56) References Cited

U.S. PATENT DOCUMENTS

| | | | |
|---|---|---|---|
| 5,927,990 A * | 7/1999 | Welch et al. | 434/226 |
| 6,799,975 B1 * | 10/2004 | Dunn | 434/365 |
| 7,008,230 B2 * | 3/2006 | Hoglund | 434/236 |
| 7,967,326 B2 * | 6/2011 | Klementowicz et al. | 280/656 |
| 8,360,782 B1 * | 1/2013 | Temple | 434/226 |
| 2006/0240392 A1 * | 10/2006 | Clifton | 434/226 |
| 2009/0042173 A1 * | 2/2009 | Jaszlics et al. | 434/219 |
| 2011/0143324 A1 * | 6/2011 | Paganini | 434/226 |

* cited by examiner

*Primary Examiner* — Kurt Fernstrom
(74) *Attorney, Agent, or Firm* — Mark A. Oathout; Oathout Law Firm (57) ABSTRACT

A method and apparatus for training one or more workers to work in a wire environment are provided. The apparatus may have a mobile platform. The apparatus may have a first training aid coupleable to the mobile platform, wherein the first training aid is configured to be moved from a transport position to a training position and a second training aid coupleable to the mobile platform, wherein the second training aid is configured to be moved from the transport position to the training position. In the training position, the first training aid and the second training aid provide a training work location that is elevated above the mobile platform for work to be performed by the one or more workers on an aerial vehicle and in the transport position the first training aid and the second training aid may be transported on the mobile platform on a highway.

19 Claims, 7 Drawing Sheets

MOBILE TRAINING TRAILER FOR ELECTRIC TRANSMISSION LINES

CROSS-REFERENCE TO RELATED APPLICATIONS

This application claims the benefit of U.S. Provisional Application No. 61/308,200 filed Feb. 25, 2010.

STATEMENTS REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO A "SEQUENCE LISTING", A TABLE, OR A COMPUTER PROGRAM

Not Applicable

REFERENCE TO A "SEQUENCE LISTING", A TABLE, OR A COMPUTER PROGRAM

Not Applicable

BACKGROUND

Embodiments of the invention relate to techniques for training workers to install and maintain electric transmission lines. More particularly, the invention relates to techniques for using a mobile training system to train workers to work with and install electric transmission lines.

Problems are encountered when attempting to train workers and especially helicopter pilots for work on electrical transmission lines. The training requires a helicopter pilot having sufficient pre-training as needed to fly and control a helicopter. Once the pre-training is complete, the pilot may be trained to work in a high-voltage wire environment. The high voltage wire environment may be numerous configurations for electric transmission lines and the underlying types of services which must be performed to construct or maintain power lines that exist in the field. For example, in the past, the helicopter training needed to sufficiently train a helicopter pilot to fly in and around high voltage wires and to perform such services may encompass four to five years of training to teach every type of service that can be performed. Further other workers in the high voltage wire environment may be required to train on existing equipment. Training the workers on the existing equipment may be extremely time consuming and dangerous. Therefore a need exists for a mobile training system that allows workers to train in a simulated high voltage wire environment.

SUMMARY

Embodiments described herein provide an apparatus for training one or more workers to work in a wire environment. The apparatus may have a mobile platform connectable to at least one set of wheels. The apparatus may have a first training aid coupleable to the mobile platform, wherein the first training aid is configured to be moved from a transport position to a training position and a second training aid coupleable to the mobile platform, wherein the second training aid is configured to be moved from the transport position to the training position. In the training position, the first training aid and the second training aid provide a training work location that is elevated above the mobile platform for work to be performed by the one or more workers on an aerial vehicle and in the transport position the first training aid and the second training aid may be transported on the mobile platform on a highway.

Embodiments described herein provide a mobile system for training one or more workers to work with elevated transmission lines. The system may have a trailer and a wood pole configured to secure to the trailer in a transport position when not in use and to be placed in a training position during training. The system may have a tower configured to secure to the trailer in a transport position when not in use and to be placed in a training position during training and a helicopter for training the one or more workers to train in a simulated elevated transmission line environment.

Embodiments described herein provide a method of training a plurality of workers to work with elevated transmission lines. The method comprising driving a mobile platform to a training location with a first training aid and a second training aid located in a training position proximate the mobile platform and moving the first training aid and the second training aid from the transport position to a training position, wherein in the training position the first training aid and the second training aid provide a training work location that is elevated above the mobile platform. The method comprising training the plurality of workers to work with a helicopter around the first training aid and the second training aid in the training position.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
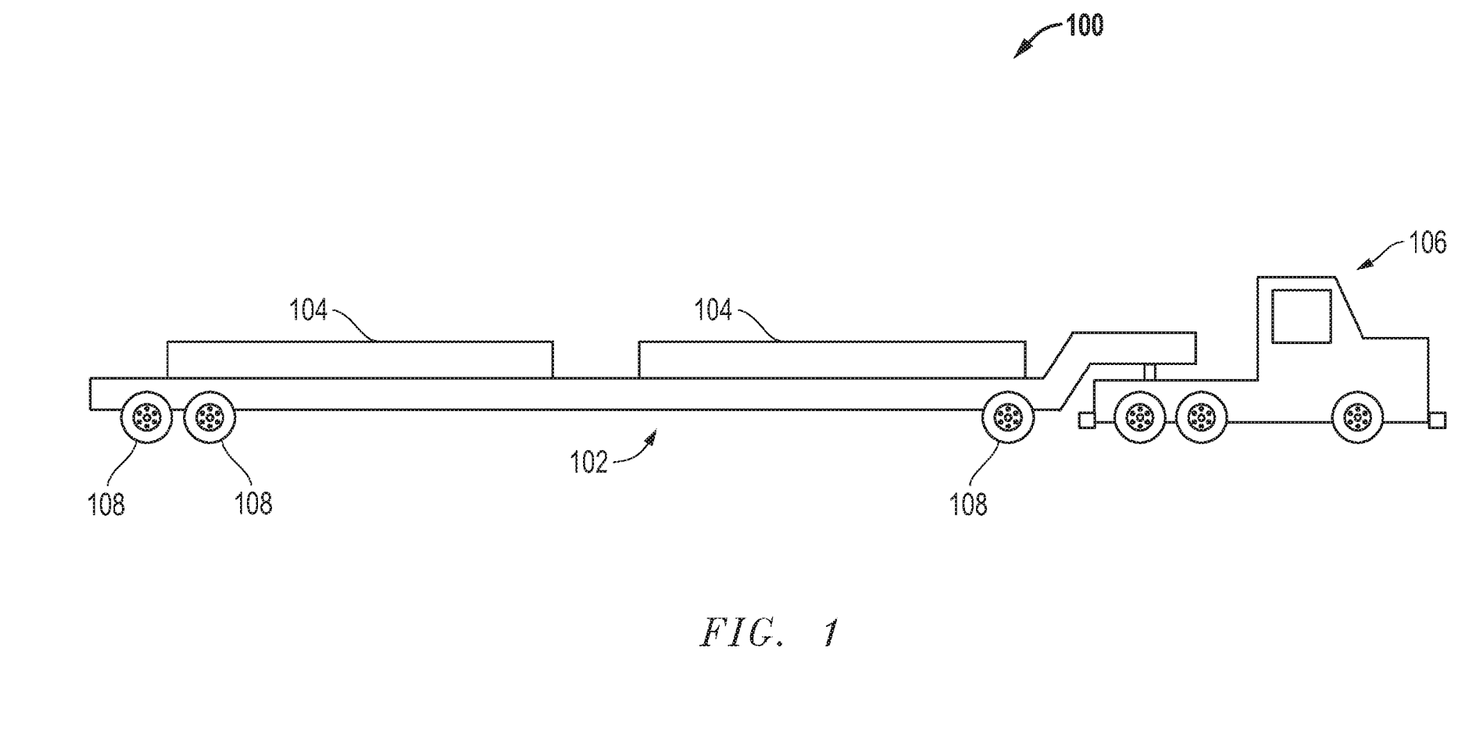
FIG. 1 depicts a schematic diagram of a mobile training system in a transport position.

FIG. 1 shows a schematic diagram depicting a mobile training system 100. The mobile training system 100 may be used to train workers such as pilots, linemen, emergency rescue workers, and the like. The workers may be trained to work with, near, and/or to install electric transmission lines. The mobile training system 100 may have a mobile platform 102 and one or more training aids 104. The one or more training aids 104 may be configured to substantially replicate the function of wire, or electric transmission line, carriers. For example, the training aids 104 may replicate a transmission tower and/or a pole, as will be discussed in more detail below. The mobile training system 100 is shown in a transport position in FIG. 1. In the transport position, the one or more training aids 104 may be collapsed, or placed, proximate the mobile platform 102. In the transport position, the training aids 104 may be in a position wherein, the mobile platform 102 may be transported on a road or highway.

The mobile platform 102 may be a trailer configured to couple to a truck 106. The truck 106 may be any suitable truck for pulling the mobile platform 102 including, but not limited to, a semi tracker trailer, a pick-up truck, a van, a car, and the like. The trailer, as shown is a goose neck trailer having one or more wheels 108. The trailer may couple and uncouple to the truck 106 for training and/or transport as needed. Although the mobile platform 102 is shown as a trailer it should be appreciated that the mobile platform 102 may be any suitable system or device for transporting the mobile training system 100 including, but not limited to a rail car, a boat, and the like.

Figure 2:
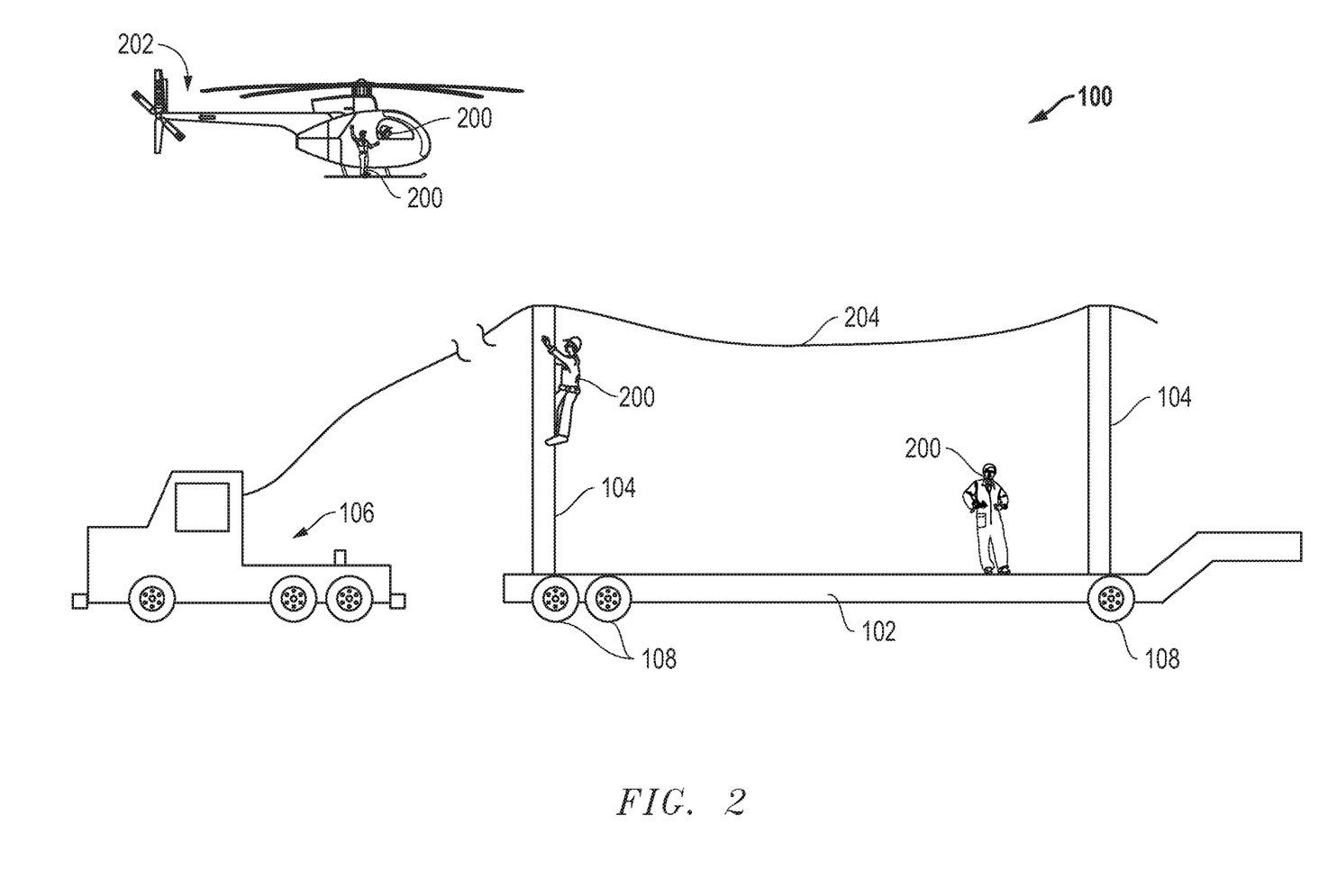
FIG. 2 depicts a schematic diagram of the mobile training system in a training position.

FIG. 2 shows a schematic view of the mobile training system 100 in the training position. In the training position, the training aids 104 may be placed upright on the mobile platform 102. In the upright position, the training aids 104 may be similar to a transmission line carrier. In the training position, the truck 106 may be uncoupled from the mobile platform 102 and moved to a location away from the mobile platform 102. Further, it should be appreciated that the truck may remain coupled to the mobile platform 102 in the training position. The mobile platform 102 may be stabilized, as will be described in more detail below, to allow for one or more workers 200 to safely train on the mobile training system 100.

The mobile training system 100 may have a helicopter 202 and one or more training lines. The helicopter 202 may be used to train the workers 200 to work with and around wire carriers. The training aids 104 may simulate the function of the wire carriers (for example towers or poles) that carrier electric transmission lines, and other cables. The training aids 104 may be used to train the workers 200 without having dangerous live electric wires.

Although the mobile training system 100 is shown as having a helicopter 202, it should be appreciated that any suitable aerial vehicle may be used for training with the mobile training system 100. The aerial vehicle may include, but is not limited to, a drone, a remote control helicopter, a remote control plane, a plane, a hovercraft, and the like.

The mobile training system 100 may be transported by the truck 106 in the transport position, as shown in FIG. 1, to a training location. The truck 106 may then be uncoupled from the mobile platform 102. The mobile platform 102 may then be stabilized in order to prevent the mobile platform 102 from moving during the erection of the training aids 104 or during the training operations. The workers 200 may then erect the training aids 104. The helicopter 202 may be used to assist the erection of the training aids 104. Once the training aids 104 are in the training position as shown in FIG. 2, the workers 200 may perform training operations including, but not limited to, building the wire carriers, clipping the wires, installing travellers, installing insulators, pulling lines, performing rescue operations, pilot training, lineman training, helicopter training for accessing transmission lines, towers and poles, material procurement and staging, installation of conductors, pulling, needlework, installing spacers, installing marker balls, installing vibration dampeners, installing bird discouragers, splicing wires, clipping dead ending full-tension conductors, dead ending static wires, maintenance, repair and replacement of all items listed herein, inspection training, patrol training, and the like. Because the mobile training system 100 may be used in remote areas without having to use live wires, the workers 200 may be trained more expeditiously than traditional in field training with installed wires.

Figure 3:
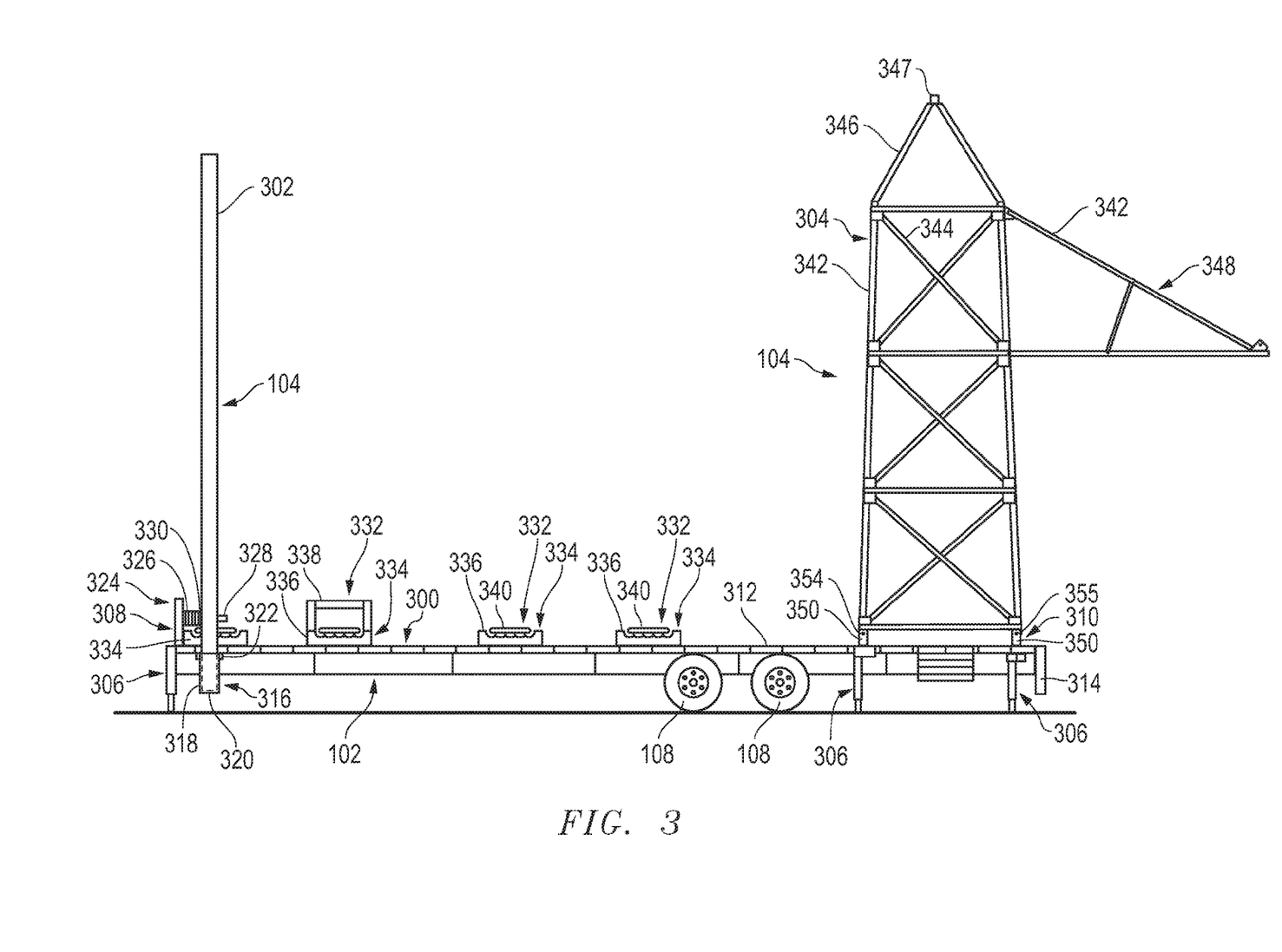
FIG. 3 depicts a side view of the mobile training system in the training position according to one embodiment.

FIG. 3 shows the mobile training system 100 in the training position according to one embodiment. The mobile platform 102 is shown as a trailer 300. The training aids 104 are shown as a wood pole 302 and a tower 304. The trailer 300 may be stabilized by one or more stabilizers 306 and/or the wheels 108. The wood pole 302 may be secured in the training position to the trailer 300 by a pole support system 308. The tower 304 may be secured in the training position to the trailer 300 by a tower support system 310.

The trailer 300 may have a trailer bed 312, the wheels 108, the stabilizers 306, and a hitch 314. The hitch 314 may be configured to secure the trailer 300 to the truck 106 (shown in FIG. 1) in the transport position. The hitch 314 may be any suitable hitch for coupling the trailer 300 to the truck 106 including, but not limited to, a fifth wheel coupling, an automatic coupling, and the like. The pole support system 308 may be located on one end of the trailer 300 while the tower support system 310 may be location on the opposite end of the trailer 300. Having the pole support system 308 and the tower support system 310 located on opposite ends of the trailer 300 allows the two training aids 104 to be spaced apart from one another in the training position. The spacing of the two training aids 104 allows the training aids 104 to simulate two separate wire carriers that would be installed in the field.

Figure 4:
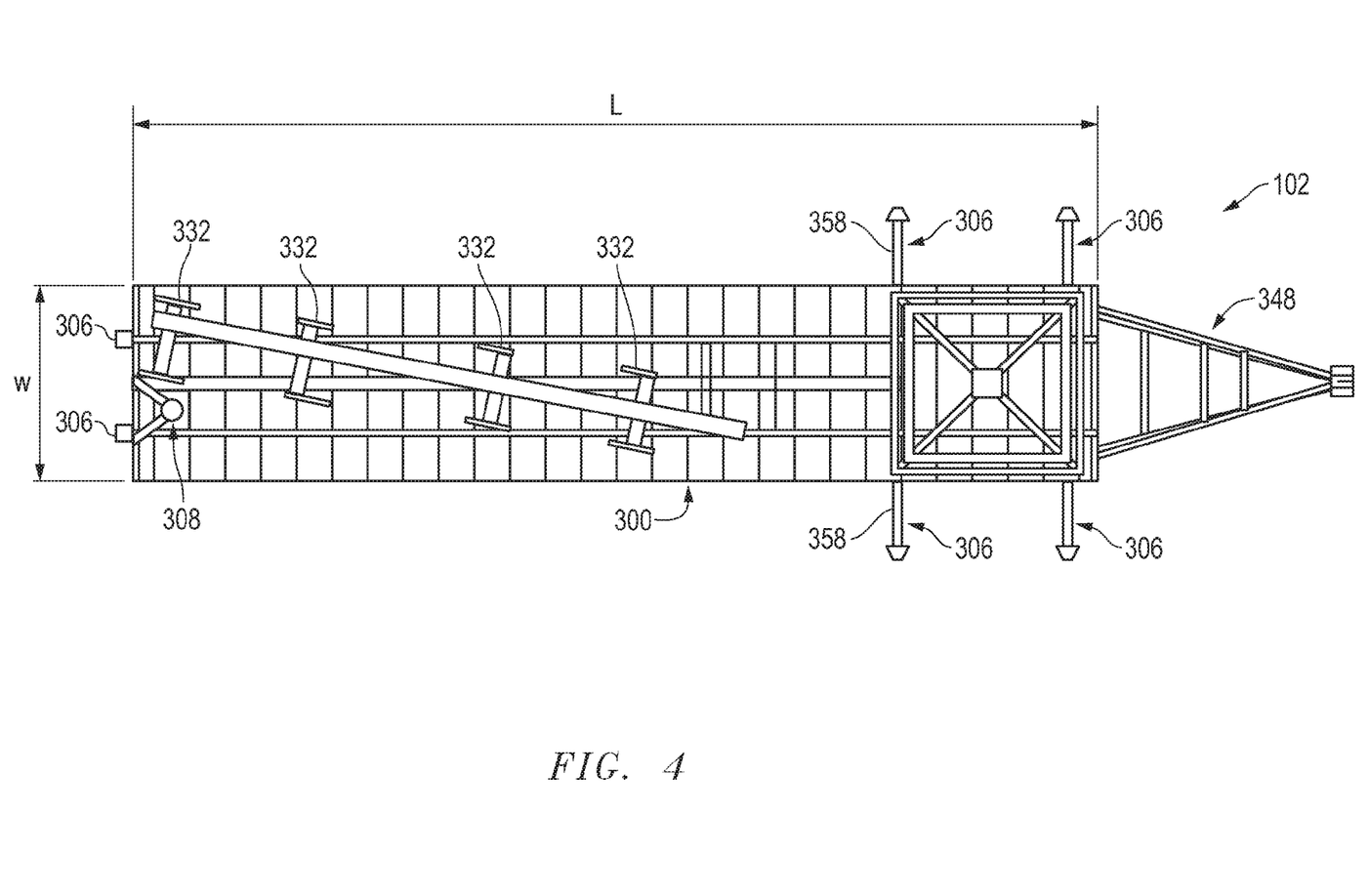
FIG. 4 depicts a top view of the mobile training system partially in the training position and partially in the transport position according to one embodiment.

FIG. 4 shows a top view of the trailer 300 according to one embodiment. The trailer 300, as shown, is a standard trailer size having a length L of forty-four feet and nine inches (44'-9") (1,363.98 cm) and a width W of eight feet five inches (8'-5") (256.54 cm) (as shown in FIG. 4). Because the trailer 300 has standard semi-tracker trailer dimensions, the trailer 300 may be transported on roadways throughout the United States and the world. Although the length L is depicted as being forty-four feet and nine inches (44'-9") (1,363.98 cm), it should be appreciated that the length L may be any suitable length including, but not limited to, standard trailer lengths fifty-three feet (53') (1,615.44 cm), forty-eight feet (48') (1,463.04 cm), forty-five feet (45') (1,371.6 cm), forty feet (40') (1,219.2 cm), thirty-six feet (36') (1,097.28 cm), thirty-four feet (34') (1,036.32 cm), thirty-two feet (32') (1,005.84 cm), thirty feet (30') (914.4 cm), twenty eight feet (28') (853.44 cm), and the like. Although the width W is depicted as being eight feet five inches (8'-5") (256.54 cm), the width W may be any suitable width including, but not limited to, eight feet six inches (8'-6") (259.08 cm), ten feet (10') (304.8 cm), eight feet (8') (243.84 cm), six feet (6') (182.88 cm), and the like.

The pole support system 308 may have a socket 316 for receiving an end of the wood pole 302 and a clamping device 324, as shown in FIG. 3. The socket 316 may be a cylindrical sleeve 318 having a socket bottom 320, and a receiving portion 322. The cylindrical sleeve 318 may have an inner diameter that is slightly larger than the outer diameter of the wood pole 302. Therefore, as the wood pole 302 is placed into the socket 316, the cylindrical sleeve 318 may assist in supporting the wood pole 302 in the training position. The socket bottom 320 is shown as a cap at the bottom of the cylindrical sleeve 318 for holding the wood pole 302 in the socket 316. Although the socket bottom 320 is shown as a cap it should be appreciated that the socket bottom 320 may be any suitable item for supporting the wood pole 302, further, there may be no socket bottom 320 and the wood pole 302 may be configured to be supported by the ground under the trailer 300. The receiving portion 322 of the socket 316 may be a funnel portion of the socket. The receiving portion 322 may receive and guide the end, or butt, of the wood pole 302 into the socket 316.

The clamping device 324 of the pole support system 308 as shown has a clamping arm 326 coupled to an arm support 328. The arm support 328 may be rigidly coupled to the trailer 300 and/or the trailer bed 312. The arm support 328 may be any suitable device for rigidly supporting the wood pole 302 on the trailer 300. The arm support 328 may include a receiving surface 330. The receiving surface 330 may be rounded, or shaped to match the contour of the wood pole 302. The clamping arm 326 may be coupled to the arm support 328 with a hinge allowing the clamping arm 326 to open to allow the wood pole 302 to engage the receiving surface 330. The clamping arm 326 may then be closed to secure the wood pole 302 in the pole support system 308. Although the clamping device 324 is shown as an arm support 328 and a clamping arm 326, the clamping device 324 may be any suitable item configured to secure the wood pole 302 in the training position including, but not limited to, one or more chain, one or more rope, one or more cable, and the like.

The wood pole 302 as shown in FIG. 3 is a wooden telephone, or utility, type pole. The wood pole 302 may be a twenty-five foot (25') (762 cm) long pole configured to have a total height of twenty-eight foot (28') (853.44 cm) in the training position. Although the wood pole 302 is shown as being twenty-five foot (25') (762 cm) long, it should be appreciated that the wood pole 302 may be any suitable length so long as the wood pole can fit on the trailer 300 including a length between the ranges of five feet (5') (152.4 cm) and fifty-five feet (55') (1,676.4 cm) long. The wood pole 302 allows the workers 200 (as shown in FIG. 2) to train on the training aid 104 in a similar manner as the worker 200 would work on an installed telephone pole.

The trailer bed 312 may have one or more pole supports 332 for supporting the wood pole 302 in the transport position, as shown in FIG. 4. The one or more pole supports 332 may be a series of cradles 334 mounted to the trailer bed 312. The cradles 334 may be configured to allow the wood pole 302 to rest on the cradles 334 in the transport position. The cradles 334 may prevent the wood pole 302 from rolling off of the trailer 300 during transport. The cradles 334 may have side walls 336 for preventing lateral movement of the wood pole 302 during transport, as shown in FIG. 3. The side walls 336 may be any suitable device for preventing the lateral movement of the wood pole 302. One or more of the cradles 334 may have a clamp 338, or gate clamp, on top of the cradle 334. The clamp 338 may be configured to close on top of the wood pole 302 when in the transport position. The clamp 338 may secure the wood pole 302 to the cradle 334 and therefore the trailer 300 during transport. The clamp 338 may secure the wood pole 302 and prevent the wood pole 302 from tilting or falling off the trailer 300 during assembly into the training position. Further, any suitable device may be used to secure the wood pole 302 to the trailer 300 including, but not limited to, tie downs, chains, rope, strap, and the like.

Some or all of the one or more pole supports 332 may have a roller surface 340. The roller surface 340 may be any suitable device that allows the wood pole 302 to roll, or move with reduced friction on the trailer 300. As shown, the roller surface 340 is a weight bearing aligned roller similar to those found in a manufacturing assembly line. Although shown as a weight bearing aligned roller, it should be appreciated that the roller surface 340 may be any suitable device.

The one or more pole supports 332 may be aligned diagonally across the trailer bed 312, as shown in FIG. 4. The diagonal position may allow the length of the wood pole 302 to be maximized relative to the length of the trailer 300. Although the one or more pole supports 332 are shown in a diagonal arrangement, it should be appreciated that the one or more pole supports 332 may be aligned in any suitable arrangement, including along the longitudinal axis of the trailer 300.

Figure 5:
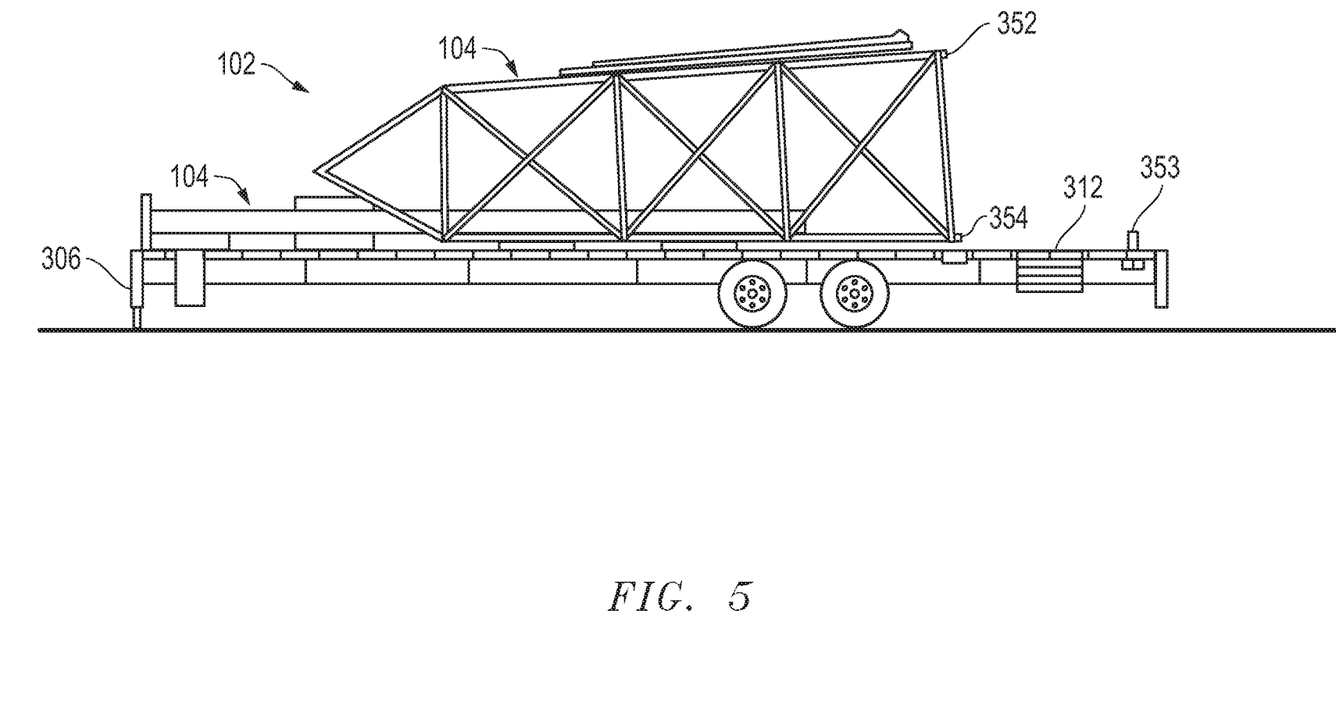
FIG. 5 depicts a side view of the mobile training system in the transport position according to one embodiment.

FIG. 5 depicts a side view of the mobile training system in the transport position according to one embodiment. In the transport position, one side of the tower 304 may rest on the trailer bed 312. The one or more pole supports 332 may store the wood pole 302 inside of the tower 304.

The tower 304 as shown in FIGS. 3-6 is a metal derrick type tower similar to those used for utility transmission lines. Although the tower 304 is shown as a metal derrick, the tower 304 may be any suitable type of transmission line structure including, but not limited to, a monopole steel, "H" frame steel, or any other structure used in electrical transmission or distribution line construction. The tower may be a lattice tower having a plurality of structural members 342 and truss members 344. The structural members 342 and the truss members 344 may have any suitable arrangement that simulates a utility transmission tower that may be constructed. In one embodiment, the tower 304 may be a double circuit tower. The tower 304 as shown is 30 feet high. Although described as 30 feet high, it should be appreciated that the tower 304 may be any suitable height for transporting on the trailer 300. The tower 304 may have a peak 346, or goat's peak. The peak 346 may have a lifting lug 347 configured to be used by the helicopter 202 as shown in FIG. 2, or by a crane (not shown) to lift and lower the tower 304 between the training position and the transport position.

The tower 304 may have a folding arm 348. The folding arm 348 may be one or more insulator arms, davit arms, lattice steel arms, or any other arm design used in electrical transmission or distribution. The folding arm 348 as shown in FIGS. 3 and 4 may extend out from the tower 304 when the tower is in the training position. The folding arm 348 may fold to a position proximate the tower 304 in the transport position, as shown in FIG. 5. The folding arm 348 may be hinged to the tower 304 to allow the folding arm to fold to the transport position. Although the folding arm 348 is shown as a hinged folding arm, it may be removable from the tower 304. The folding arm 348 may have a lifting lug 347 similar to the lifting lug on the peak 346. The lifting lug 347 on the folding arm 348 may be used to assist in moving the folding arm 348 between the transport and the training position. The folding arm 348 may be used for any suitable training including, but not limited to, training in the assembly of the structure itself, hanging insulators, hanging blocks, travelers, fly blocks, clipping wire, de-clipping wire, hardware change out, transferring workers from helicopter to structure and visa-versa, pulling sock line, pulling conductor, installing/removing conductor, installing/removing Overhead Optical Ground Wire (OPGW) and/or static wire, proper technics in climbing structures, proper grounding practices, and/or any other line standard practices including, but not limited to, safety and rescue.

The tower support system 310 may be configured to support the tower 304 in the training position as shown in FIGS.

3 and 4. Further the tower support system 310 may be configured to guide the tower 304 as the tower 304 moves from the transport position to the training position. The tower support system 310 may have a plurality of posts 350 for securing the tower 304 to the trailer 300. As shown there are four posts 350 wherein one post 350 is located proximate each corner of the tower 304. The posts 350 may secure to the trailer bed 312 in any suitable manner including, but not limited to, bolting, welding and the like. As shown in FIG. 3, two of the posts 350 are configured to receive a tower leg 352 (as shown in FIG. 5) into the post 350. The posts 350 configured to receive the tower legs 352 may have a hole 353 as shown in FIG. 5, for receiving a pin 355 (as shown in FIG. 3) in the training position. The pin 355 may secure the tower legs 352 and therefore the tower 304 to the posts 350 in the training position.

Two of the posts 350, shown as the two posts closest to the socket 316, may have a hinge 354. The hinge 354 may allow the two posts 350 to guide the tower 304 as the tower is moved between the training position and the transport position. The hinge 354 may further support the tower 304 in both the training position (as shown in FIG. 3) and the transport position (as shown if FIG. 5).

Figure 6:
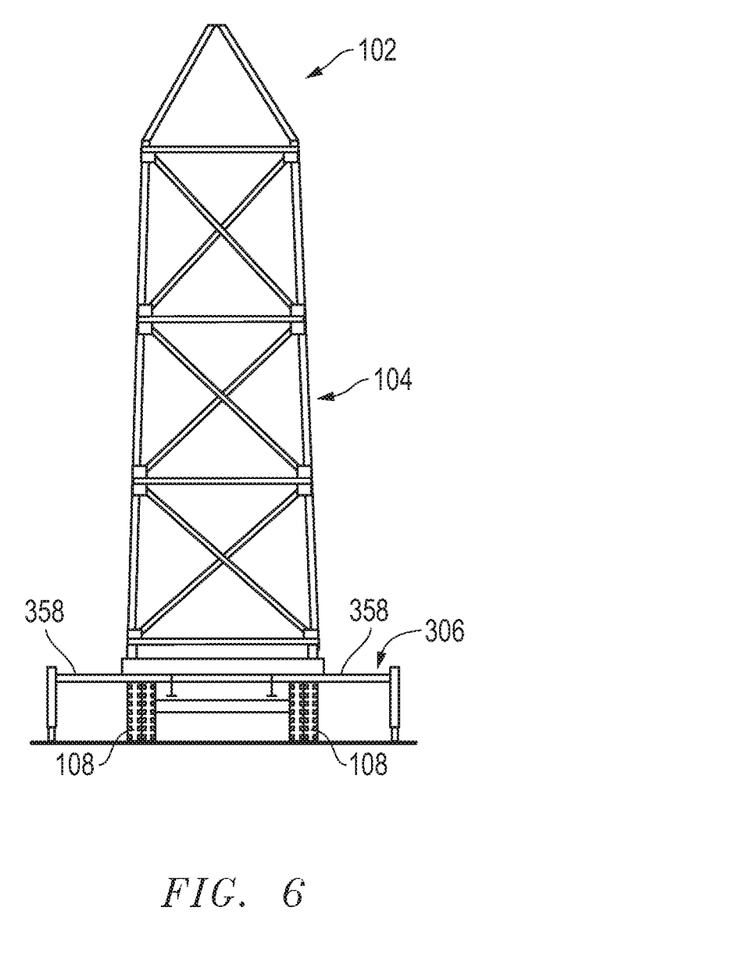
FIG. 6 depicts an end view of the mobile training system in an embodiment.

FIG. 6 shows an end view of the trailer 300 with the tower 304 in the training position and the stabilizers 306 stabilizing the trailer 300. The stabilizers 306 may be configured to stabilize and/or level the trailer 300. The stabilizers 306 may be located at several locations about the trailer 300 in order to stabilize and/or level the trailer 300. As shown there are two stabilizers 306 located near the socket end of the trailer 300 and four stabilizers 306 located near the tower 304. Although there are six stabilizer 306 shown, it should be appreciated that there may be any number of stabilizers 306 located around the trailer 300.

Each of the stabilizers 306 may be a telescoping jack, as shown, coupled to the trailer 300. The telescoping jacks may be extended once the trailer 300 is at the training location in order to engage the ground or an outrigger pad (not shown). The telescoping jacks may then be adjusted until the trailer 300 is level and/or secure. The outrigger pads may be any suitable device for providing a solid surface for the stabilizer 306 to engage including, but not limited to, a concrete block, a wood block, a metal pad, three feet×three feet×one foot (91.44 cm×91.44 cm×30.48 cm) poly pads, and the like.

In addition to the telescoping jacks, one or more of the stabilizers 306 may have an outrigger 358, as shown in FIGS. 4 and 6. The outrigger 358 may be configured to extend the telescoping jack a distance from the trailer 300. The extended jacks, or stabilizers 306 may prevent the trailer from tipping over during training. The outriggers 358 may be extendable from the trailer in a telescoping manner thereby allowing the stabilizer 306 to be close to the trailer during transport. Further, the outriggers 358 may be hinged, and/or removeably coupleable to the trailer 300 in any suitable manner.

In operation the mobile platform 102 may be transported to a training location in the transport position, as shown in FIGS. 1 and 5. The mobile platform 102 may be driven to the training location using the truck 106 as shown in FIG. 2. Once the mobile platform 102 is at a suitable training location, the truck 106 may be uncoupled from the mobile platform and the stabilizers 306 may be used to secure and/or level the mobile platform 102. For example, the telescoping jacks of the stabilizers 306 may be extended until the telescoping jacks engage the ground and/or the outrigger pads, as shown in FIGS. 3, 5 and 6. If the ground is solid enough to support the stabilizers 306, no outrigger pads may be used; however, if the ground is unstable, the outrigger pads may be used for each of the stabilizers 306. It is preferred that the mobile platform 102 be set up on concrete, black top, or gravel although it is not necessary. A worker 200 (as shown in FIG. 2) may then adjust each of the stabilizers 306 until the mobile platform 102 is substantially level, or at an acceptable pitch. With the mobile platform 102 secure, the worker(s) 200 may then prepare to move the training aids 104 to the training position as shown in FIGS. 2, 3 and 6.

To move the mobile platform 102 to the training position as shown in FIGS. 2, 3 and 6, the workers 200 may remove the clamps 338 and/or any other straps, chains and the like from the wood pole 302. The removal of the clamps 338 may begin at the butt end, the end located inside the tower 304, until the last clamp 338 and/or strap remains at the top of the wood pole 302. Then remove the final clamp 338 and/or strap from the top of the wood pole 302. One worker 200 can easily handle the wood pole 302 in this position. The wood pole 302 should then be pulled out thereby allowing the top of the wood pole 302 to extend past the front end, the end with the socket 316, of the trailer 300. The worker 200 may stop the movement of the wood pole 302 once the butt of the wood pole 302 clears the peak 346 of the tower 304. A pole collar, and/or one of the clamps 338, may be incorporated to prevent the wood pole 302 top from hitting the ground or the butt from rising in the air. With the wood pole 302 clear of the tower 304, the tower 304 may now be erected. While erecting the tower 304, the wood pole 302 may be strapped and/or clamped clear of the tower 304 but flat on the trailer 300.

To move the tower 304 to the training position, one or more straps (not shown) securing the tower 304 to the trailer 300 may be removed. The folding arm 348 may be extended to the training position (as shown in FIG. 3) while the tower 304 is still flat on the trailer 300. A rope, shackle, or other device to assist lifting of the tower 304 may be secured to the lifting lug 347 on the peak 346 of the tower 304. Then using any suitable lifting device including, but not limited to, the helicopter 202, a crane, a jack, and the like, the lifting lug 347 may be used to lift the tower 304. During lifting the worker(s) 200 should check along the trailer bed 312 and main rails, or structural members 342, of the tower 304 for any fowling. The tower 304 should continue to be lifted until the tower 304 approaches 45 degrees. At a position close to 45 degrees, the tower 304 may be past the center of gravity and thereby begin falling on its own weight. Due to the shift in weight of the tower 304, backpressure and/or tension should be applied on the lifting lug 347 to prevent the tower 304 from falling to the training position. As the tower legs 352 approach the posts 350, the worker(s) 200 should take care to ensure that the tower legs 352 are aligned with the posts 350. With the tower legs 352 inside, or outside depending on the arrangement, of the posts 350, the tower legs 352 may be secured to the posts 350 using the pins 355. The worker(s) 200 may then climb the tower 304 to disconnect the lifting lug 347.

The wood pole 302 may then be moved to the training position as shown in FIG. 3. In one embodiment, two 10 foot long nylon slings (not shown but suitable for use to lift the wood pole 302) may be attached to the top of the wood pole 302 at 180 degrees apart. Using any suitable lifting device including those described herein tension may be applied to the top of the wood pole 302. The lifting device may lift the wood pole 302 and maneuver the butt of the wood pole 302 over the socket 316. The butt of the wood pole 302 may then be lowered into the socket 316. The clamping device 324 may then be used to secure the wood pole 302 in the training position as shown in FIG. 3. The mobile platform 102 may be moved back to the transport position in an opposite manner as described for setting it up in the training position.

With the mobile platform 102 in the training position, the workers 200 may train to install wire transmission lines. Further, the workers 200 may train on all aspects of repair, installation, rescue, and the like that may typically be performed on installed transmission poles and/or installed towers. The worker 200 may perform the training without the need to use live wires, or go to remote locations. Thus, the mobile training system 100 is a self-contained and mobile training center. The workers 200 may be trained to build and clip wires, travelers, and insulators, to pull lines/transfers among any and all of the above mentioned services. The conductive line work includes training for all types of transmission lines such as static, optical & fiber, and ground lines. The training is preferably performed by the helicopter 202 (but not necessarily so) with emphasis placed upon enhancing confidence and safety. Since the training can be performed at other than an actual tower location in the field, it can be performed without wires including without actual live wires, i.e. without high voltage transmission lines. This greatly enhances the ability to train the workers 200 with confidence and safety. The helicopter 202 may fly in and around the training aids 104, or towers 304 and wood poles 302, without the risks associated with actual wires and live wires. However to simulate line tension the training line 204 (as shown in FIG. 2) may be tied between the training aids 104, for example the wood pole 302 and/or tower 304, and the truck 106. The training line 204 may then be pulled by the truck 106 to simulate line tension for further training.

Figure 7:
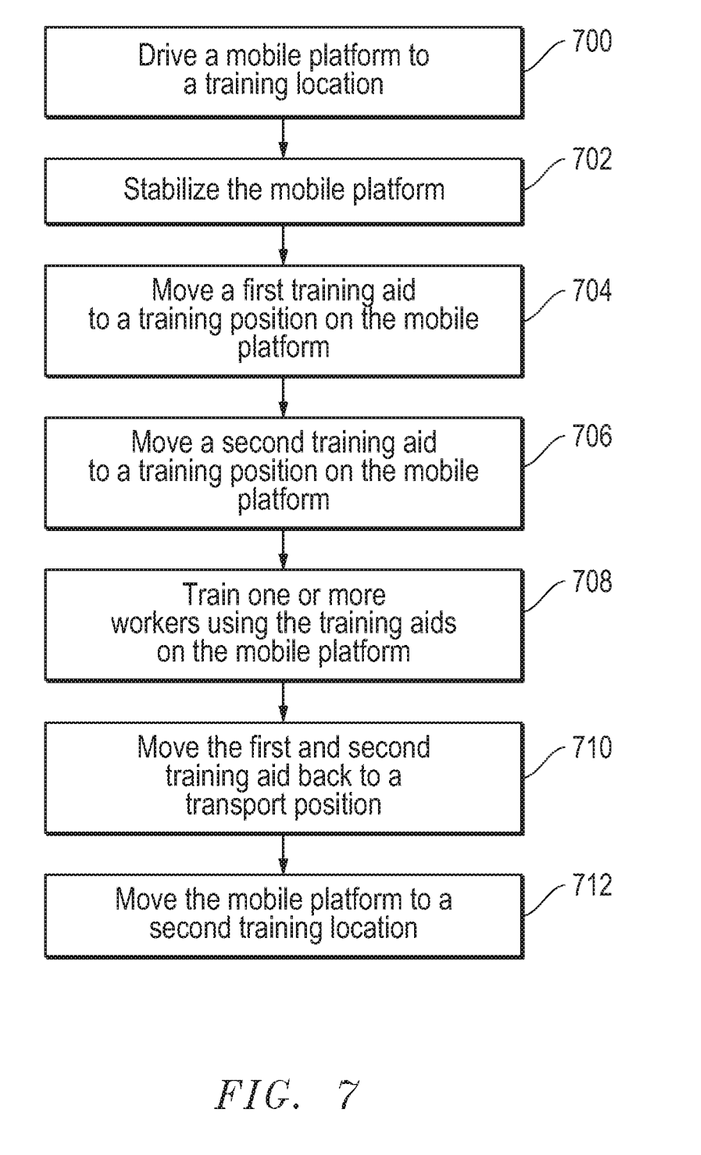
FIG. 7 depicts a flow diagram depicting a method of using the mobile training system.

FIG. 7 depicts a flow diagram depicting a method of using the mobile training system. The flow begins at block 700, wherein the mobile platform is moved to a training location. The mobile platform may be moved to the training location using any method described herein. The flow continues at block 702, wherein the mobile platform is stabilized to prevent the mobile platform from tipping or moving during training. The flow continues at block 704, wherein the first training aid is moved to the training position. The flow continues at block 706, wherein the second training aid is moved to the training position. It should be appreciated that there may only be one training aid, two training aids, or more than two training aids. The flow continues at block 708, wherein one or more workers are trained using the mobile platform with the training aids. The flow continues at block 710, wherein the first and second training aids are moved to a transport position. The flow continues at block 712, wherein the mobile platform is moved to a second training location. Because the mobile platform is coupleable to a truck, the mobile platform may be moved all over the country and/or the continent for training the workers.

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to any mobile helicopter training facility.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus for training one or more workers to work in a wire environment, the apparatus comprising:
   a mobile platform connectable to at least one set of wheels;
   a first training aid coupleable to the mobile platform, wherein the first training aid is a wood pole and is configured to be moved from a transport position to a training position;
   a second training aid coupleable to the mobile platform, wherein the second training aid is configured to be moved from the transport position to the training position; and
   wherein in the training position the first training aid and the second training aid provide a training work location that is elevated above the mobile platform for work to be performed by the one or more workers on an aerial vehicle and in the transport position the first training aid and the second training aid may be transported on the mobile platform on a highway.

2. The apparatus of claim 1, wherein the wood pole is at least 20 feet long.

3. The apparatus of claim 1, wherein the second training aid is a tower.

4. The apparatus of claim 3, wherein the tower is at least 20 feet high in the training position.

5. The apparatus of claim 3, wherein the tower is a lattice tower.

6. The apparatus of claim 5, wherein the lattice tower is a double circuit tower.

7. The apparatus of claim 1, wherein the mobile platform is a trailer configured to connect to a truck.

8. A mobile system for training one or more workers to work with elevated transmission lines, the system comprising:
   a trailer;
   a wood pole configured to secure to the trailer in a transport position when not in use and to be placed in a training position during training;
   a tower configured to secure to the trailer in a transport position when not in use and to be placed in a training position during training; and
   a helicopter for training the one or more workers to train in a simulated elevated transmission line environment.

9. The mobile system of claim 8, further comprising a training line configured to be secured to the wood pole and the tower in the training position by the workers to simulate an electric transmission line.

10. The mobile system of claim 8, further comprising one or more stabilizers configured to substantially level the trailer during training.

11. The mobile system of claim 8, further comprising a pole support system configured to secure the wood pole to the trailer in the training position.

12. The mobile system of claim 8, further comprising a tower support system configured to secure the tower to the trailer in the training position.

13. The mobile system of claim 8, further comprising a plurality of cradles secured to a trailer bed, wherein the plurality of cradles are configured to support the wood pole within the tower when the tower and the wood pole are in the transport position.

14. A method of training a plurality of workers to work with elevated transmission lines, the method comprising:
   driving a mobile platform to a training location with a first training aid and a second training aid located in a training position proximate the mobile platform;

moving the first training aid and the second training aid from the transport position to a training position, wherein in the training position the first training aid and the second training aid provide a training work location that is elevated above the mobile platform;

training the plurality of workers to work with a helicopter around the first training aid and the second training aid in the training position.

15. The method of claim 14, further comprising stabilizing the mobile platform at the training location.

16. The method of claim 14, wherein training the plurality of workers further comprising training a pilot to fly the helicopter around the training aids.

17. The method of claim 14, wherein training the plurality of workers further comprises training a worker on installing electric transmission lines.

18. The method of claim 14, further comprising using the helicopter to move the first training aid and the second training aid to the training position.

19. The method of claim 14, further comprising moving the mobile platform to a second training location for training.

* * * * *